(12) United States Patent
Macalka et al.

(10) Patent No.: US 7,895,093 B2
(45) Date of Patent: Feb. 22, 2011

(54) SYSTEM AND METHOD FOR UTILIZING PROFORMA PROCESSING OF ADJUSTMENTS IN CONSOLIDATION PROCESSES

(75) Inventors: Lisa M. Macalka, Dublin, CA (US); Ravindran R. Appiah, Danville, CA (US); Monica Sandeep Bhat, Pleasanton, CA (US); Dale Chung-Te Chen, Oakland, CA (US); Lynn Christensen, Oakland, CA (US); Christopher Ngan, Sunnyvale, CA (US); Barbara Carol Roudebush, Livermore, CA (US); Marlene Patricia Siebert, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1236 days.

(21) Appl. No.: 10/648,504

(22) Filed: Aug. 25, 2003

(65) Prior Publication Data

US 2007/0179872 A1 Aug. 2, 2007

(51) Int. Cl.
*G07B 17/00* (2006.01)
*G06Q 40/00* (2006.01)
(52) U.S. Cl. .......................... 705/30; 705/35
(58) Field of Classification Search ............ 705/30, 705/35
See application file for complete search history.

(56) References Cited

U.S. PATENT DOCUMENTS

| 5,978,780 | A | * | 11/1999 | Watson | 705/40 |
| 6,513,019 | B2 | * | 1/2003 | Lewis | 705/35 |
| 7,120,597 | B1 | * | 10/2006 | Knudtzon et al. | 705/30 |
| 2003/0046194 | A1 | * | 3/2003 | McClendon et al. | 705/30 |

OTHER PUBLICATIONS

Beams Floyd A., Advanced Accounting, 1992, 5th edition, ISBN 0-13-010489-2, pp. 122-131.*

* cited by examiner

*Primary Examiner*—F. Ryan Zeender
*Assistant Examiner*—Fahd A Obeid
(74) *Attorney, Agent, or Firm*—Kilpatrick Townsend & Stockton LLP

(57) ABSTRACT

A system and method is provided for utilizing proforma processing on adjustments in consolidation processes. The system comprises a proforma consolidation processor configured for consolidating at least one adjustment entry received from an adjustment journal. The proforma consolidation processor only performs consolidation on the at least one adjustment entry. The results of the proforma consolidation is then output to a pending journal. An inquiry module allows display of the pending journal along with current consolidation ledger balances. If the results of the proforma consolidation are acceptable, then a post module posts the pending journal and the at least one adjustment to the consolidation ledger.

18 Claims, 13 Drawing Sheets

Trial Balance

Business Unit: United States Consolidation   Scenario: ACTUAL Consolidation   Currency Code: USD

Fiscal Year: 2002 Period: 10 October   Consolidation Node: National Electric Company

Total Balance: 46,173.40

First | Previous | Next | Last | Left | Right — 502

Options  Accounts  Dimensions

Account Balances — 504

Customize | Find | View All   First 1-8 of 8 Last — 506

| Account | Description — 508 | Ledger Balance — 510 |
|---|---|---|
| 170011 | Investment in FRET | 7,572.00 |
| 170012 | Investment in OIL | 16,214.00 |
| 170013 | Investment in MINE | 16,697.00 |
| 170014 | Investment in SHIP | 702.00 |
| 170021 | Invest in FRET (Current Year) | -171.00 |
| 170022 | Invest in OIL (Current Year) | 2,010.40 |
| 170023 | Invest in MINE (Current Year) | 2,600.00 |
| 170024 | Invest in SHIP (Current Year) | 549.00 |

- USCON
  - ELIMU
  - NAT — 512
  - ⊞ USLE1
  - ⊞ USLE2

Consolidation Home Page

[Return to Search] [Notify]

Trial Balance | Ledger Balance by Account

FIG. 5

| Journal Entries | Journal Approval |

Journal ID: ADJ103102B ~602    Journal Date: 10/31/2002 ~604    Status: Valid ~606

Business Unit: USCON    United States Consolidation    Ledger ID: GCCLEDMGT

Scenario ID: CONACT1    ACTUAL Consolidation

▽ Journal Information

Source: [ ]    Fiscal Year: 2002 ~610    Period: 10 ~612    Base Currency: USD ~614

Description: Adjustment to record additional October sales from SHIP subsidiary    ~615

[ Calculate ]  [ Copy ]

☐ Hold Posting

Total Debits: 500.00    Total Credits: 500.00

Journal Lines ~616    Customize | Find | View All    First ◁ 1-2 of 2 ▷ Last

| Line | Ledger Unit | Account | Department | Product ID | Total Debits | Total Credits | Currency | Amount |
|---|---|---|---|---|---|---|---|---|
| 1 | SHIP | 400000 | 21000 | SHPSVC | | | USD | -500.00 |
| 2 | SHIP | 120000 | | | 500.00 | | USD | 500.00 |

~618  ~620  ~622  ~624   ~626  ~628
~630

[+Add]

Journal Totals    Customize | Find | View All    First ◁ 1 of 1 ▷ Last

| Unit | Total Lines | Base Currency | Total Debits | Total Credits |
|---|---|---|---|---|
| SHIP | 2 | USD | 500.00 | 500.00 |

~632  ~634

Consolidation Home Page

* Required Field

[Save] [Return to Search] [Next in List] [ ] [Notify]

Run Jobstream

User ID: DVP1
Run Control ID: USCON_EQUITIZATION

Report Manager   Process Monitor   Run

Clear Last Suite   Clear All Suites

Process Information

Program Name: PF_JOBSTREAM
☐ As Of Dated Jobstream

*Description: USCON Equitization

*Unit: USCON

*Scenario ID: CONACT1

Fiscal Year: 2002

Period: 10

*Jobstream ID: GC_EQ_MGR
☑ Rerun

Last Run On: 08/25/2002 4:14:21PM PDT

When: Always ▼

☐ Override Scenario's Tree Node
Tree Node:
☑ Proforma          Select Journals — 712
☐ Post Journal Created As Of Date: 10/31/2002

710
714

702, 708, 704, 706

☐ Send Email Notification
Specify Email Parameters

Save   Return to Search   Notify                    Add

* Required Field

Proforma Trial Balance

Business Unit: United States Consolidation  Scenario: ACTUAL Consolidation  Amount Type: Period Activity  Currency Code: USD
Fiscal Year: 2002  Period: 10  Oct 2002  Consolidation Node: National Electric Company
Total Balance: 0.00

First | Previous | Next | Last | Left | Right

- USCON
  - ELIMU
  - NATL
  - ⊞ USLE1
  - ⊞ USLE2

1008

Options  Accounts  Dimensions  Journals  Create Journals  Post Journals

Account Balances    Customize | Find | View All  First ◀ 1-2 of 2 ▶ Last

| Account | Description | Ledger Balance | Journal Balance | Proforma Ledger Balance |
|---|---|---|---|---|
| 170024 | Invest in SHIP (Current Year) | 549.000 | 500.00 | 1,049.00 |
| 400011 | Earnings for SHIP | -549.00 | -500.00 | -1,049.00 |

1002  1004  1006

Consolidation Home Page
(Q Return to Search) (E Notify)
Pro-forma Trial Balance | Ledger Balance by Account | Journal Balance by Account

Proforma Trial Balance

Business Unit: United States Consolidation  Scenario: ACTUAL Consolidation  Amount Type: Period Activity  Currency Code: USD
Fiscal Year: 2002 Period: 10 Oct 2002  Consolidation Node: National Electric Company
Total Balance: 46,673.40

First | Previous | Next | Last | Left | Right

Options  Accounts  Dimensions  Journals  Create Journals  Post Journals

Account Balances

Customize | Find | View All   First ◀ 1-8 of 8 ▶ Last

| Account | Description | Ledger Balance | Journal Balance | Proforma Ledger Balance |
|---|---|---|---|---|
| 170011 | Investment in FRET | 7,572.000 | 0.00 | 7,572.00 |
| 170012 | Investment in OIL | 16,214.00 | 0.00 | 16,214.00 |
| 170013 | Investment in MINE | 16,697.00 | 0.00 | 16,697.00 |
| 170014 | Investment in SHIP | 702.00 | 0.00 | 702.00 |
| 170021 | Invest in FRET (Current Year) | -171.00 | 0.00 | -171.00 |
| 170022 | Invest in OIL (Current Year) | 2,010.40 | 0.00 | 2,010.40 |
| 170023 | Invest in MINE (Current Year) | 2,600.00 | 0.00 | 2,600.00 |
| 170024 | Invest in SHIP (Current Year) | 549.00 | 500.00 | 1,049.00 |

📁 USCON
  📁 ELIMU
  📁 NATL
  ⊞ USLE1
  ⊞ USLE2

Consolidation Home Page  [Notify]

[Return to Search]

Pro-forma Trial Balance | Ledger Balance by Account | Journal Balance by Account

FIG. 10b

SYSTEM AND METHOD FOR UTILIZING PROFORMA PROCESSING OF ADJUSTMENTS IN CONSOLIDATION PROCESSES

BACKGROUND OF THE INVENTION

1. Field of the Invention

The present invention relates to accounting and more particularly to processing of adjustments in consolidations.

2. Description of Related Art

Consolidation is the combination of accounts of multiple source ledgers into one consolidated ledger. These multiple source ledgers may contain accounts of a parent company and all subsidiaries within a single business entity. Referring to FIG. 1a, a conventional consolidation system is shown. Typically, data entries from the multiple source ledgers are sent to the consolidation ledger 102. Then, the consolidation processor 104 performs consolidation processing on the consolidation ledger 102 entries. The consolidation processor 104 usually comprises an inter-company eliminations module 106 for performing inter-company eliminations (i.e., elimination of activities between two subsidiaries of the same business entity), a NCI eliminations module 108 for performing non-controlling interest eliminations (i.e., elimination of equity of subsidiary against a parent investment), and an equitization module 110 for reflecting net income of a subsidiary on a parent's ledger. Once the consolidation processing is complete, results are output to a journal 112, and posted by a post module 114 back to the consolidation ledger 102.

However, users often need to make adjustments to the consolidation data (e.g., for statutory or management purposes). Referring now to FIG. 1b, a prior art consolidation system for performing adjustments to a consolidation ledger 102 is shown. The consolidation process as described in connection with FIG. 1a (i.e., solid lines) is initially performed. In the adjustment consolidation process (i.e., dashed lines), adjustment entries are provided to an adjustment journal 118. The adjustment journal 118 is then posted to the consolidation ledger 102 via the post module 114. Once posted, the consolidation data (i.e., original ledger rows along with the adjustment rows) are then processed through the consolidation processor 104, and the results are output to the journal 112. Finally, the journal 112 entries are posted by the post module 114 back to the consolidation ledger. The contents of the consolidation ledger 102 may be viewed via an inquiry module 116.

Disadvantageously, this prior art system requires the posting of adjustments to the consolidation ledger 102, reprocessing of all relevant data in the consolidation ledger 102, and posting of results back to the consolidation ledger 102. Consequently, the prior art consolidation system is inefficient and time consuming. For example, a parent company and its subsidiaries may have 2,000,000 rows of data in the consolidation ledger 102. Of these 2,000,000 rows of data, a consolidation process may run with 500,000 ledger rows (e.g., revenues and expenses for the subsidiaries) which total $75,000 across 199 different departments. Consolidation processing will result in a 200 line (i.e., row) journal 112 entry (one line for each of the 199 different departments and one line debiting a parent investment for $75,000) for a total of $75,000. Subsequently, the journal 112 entry is posted to the consolidation ledger 102 resulting in a new overall row count of 2,000,200.

Assume now that the adjustment journal 118 contains additional revenue for five departments for a total of $3,000. Using double entry accounting, there are ten rows of detail in the adjustment journal 118 (i.e., five rows for revenue entries and five rows with offsets to cash). Initially, the adjustment journal 118 is posted by the post module 114 to the consolidation ledger 102 resulting in the row count rising to 2,000,210. The consolidation processor 104 then runs the consolidation process. First, the results of the previous consolidation processing are reversed from a ledger balance (i.e., 200 rows are updated, 0 rows are added or deleted). Then, 500,010 ledger rows (i.e., the updated 500,000 ledger rows and the 10 rows of details with the adjustments) are input to the consolidation processor 104 which now total $78,000 across 204 different departments (199 original departments and five departments with the adjustments). The result is an output with a 205 line (i.e., row) journal 112 entry (i.e., one line for each of the 204 different departments and one line debiting a parent investment for $78,000). Finally, the 205 line journal 112 entry is posted to the consolidation ledger 102 updating the 200 rows added in the previously consolidation processing and adding five new rows. Resultingly, the consolidation ledger 102 now contains 2,000,215 ledger rows.

As is evident from this example, the amount of time required to process just five adjustments is approximately the same as for processing an entire data set (i.e., the original 500,000 ledger rows). Thus, prior art systems are inefficient. Furthermore, because the post-adjustment consolidation journal 112 is posted to the consolidation ledger 102 before a user is allowed to view the results, there is limited visibility into how adjustments impact an overall consolidation prior to approval and finalization. Consequently, prior art consolidation systems do not allow the user to quickly and efficiently perform "what-if" analyses and incremental changes to consolidated data.

Therefore, there is a need for a system and method for efficiently processing adjustments in consolidation.

SUMMARY OF THE INVENTION

The present invention provides a system and method for utilizing proforma processing on adjustments in consolidation processes. The system comprises a proforma consolidation processor configured for consolidating at least one adjustment entry received from an adjustment journal. The proforma consolidation processor only performs consolidation on the at least one adjustment entry. The results of the proforma consolidation (i.e., consolidated adjustment entries) are then output to a pending journal. An inquiry module allows display of pending journal entries along with current consolidation ledger balances. If the results of the proforma consolidation are acceptable, then a post module posts the pending journal and the at least one adjustment to the consolidation ledger.

According to an exemplary method, adjustments are processed separately from the previously consolidated data stored in the consolidation ledger. At least one adjustment entry from an adjustment journal is sent to a proforma consolidation processor. The at least one adjustment is processed and is output to a pending journal. Subsequently, a user may view pending journal entries along with current consolidation ledger balances. If the results are acceptable, then the pending journal and the at least one adjustment are posted to the consolidation ledger.

Thus, the present invention allows the user to have visibility into how adjustments impact overall consolidation without having to post the adjustments and results to the consolidation ledger. This allows for "what-if" analysis to be performed (i.e., inputting various adjustments to test the outcome). Additionally, because the proforma consolidation processor only processes the adjustments, the overall consolidation process is efficient and quick.

BRIEF DESCRIPTION OF THE DRAWINGS

FIG. 2b is an exemplary block diagram of the proforma consolidation processor of FIG. 2a;

FIG. 5 is an exemplary screen shot of a balance page;

FIG. 6 is an exemplary screen shot of adjustment journal entries;

FIG. 7 is an exemplary proforma equitization page;

FIG. 10a is a proforma trial balance page, according to one embodiment of the present invention; and FIG. 10b is an alternative proforma trial balance page, according to another embodiment of the present invention.

DESCRIPTION OF THE PREFERRED EMBODIMENT

The present invention provides a system and method for utilizing proforma processing of adjustments in consolidation processes. Unlike prior art systems, the present invention processes adjustments separately from data stored in a consolidation ledger before the adjustments are posted to the consolidation ledger. Further, a user may decide, upon viewing results of proforma processing, whether to post the adjustments and corresponding results to the consolidation ledger. This allows for visibility into how adjustments impact overall consolidation and for "what-if" analyses to be performed.

Figure 1A:
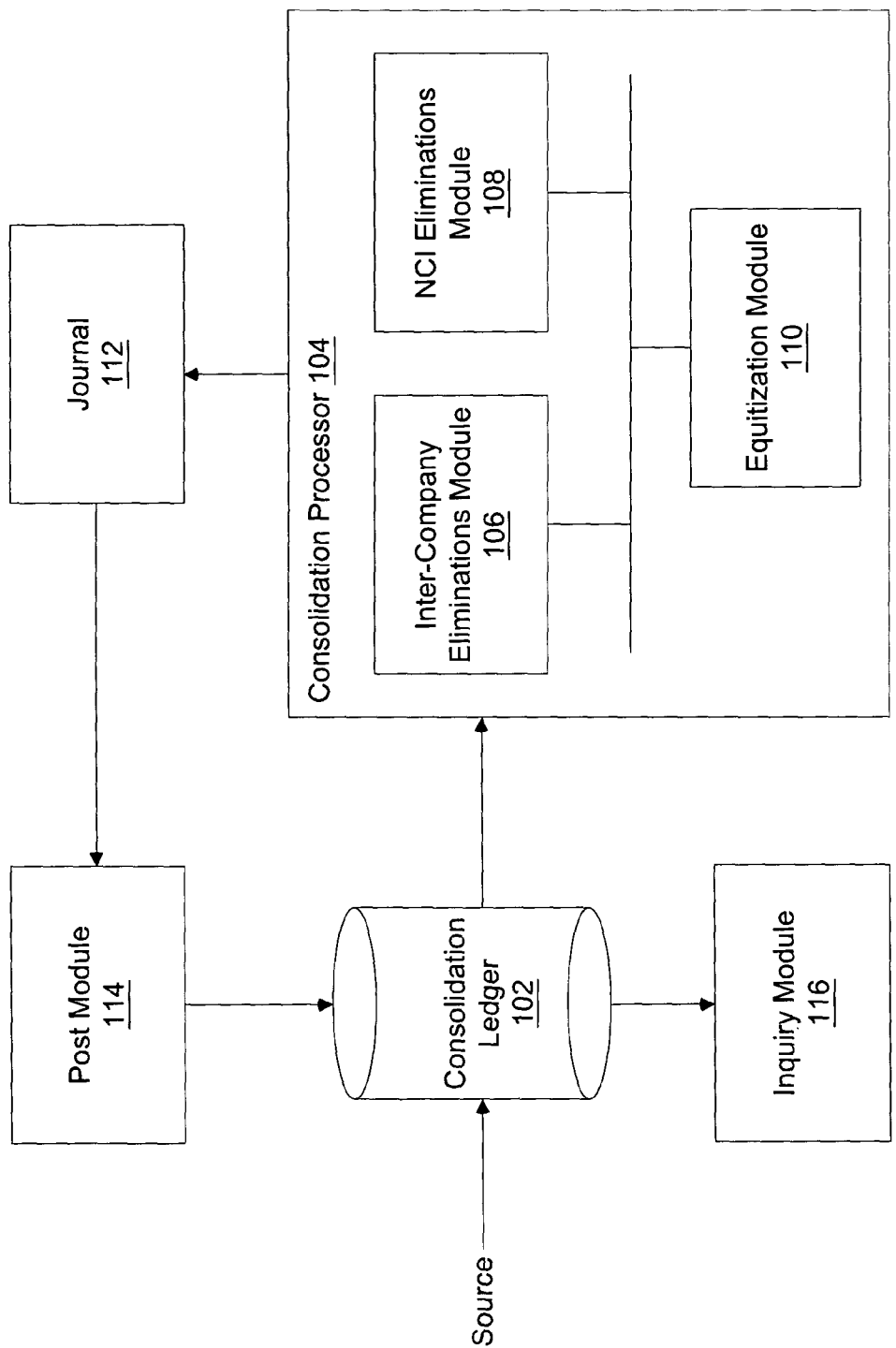
FIG. 1a is a block diagram of a prior art consolidation system.
Figure 1B:
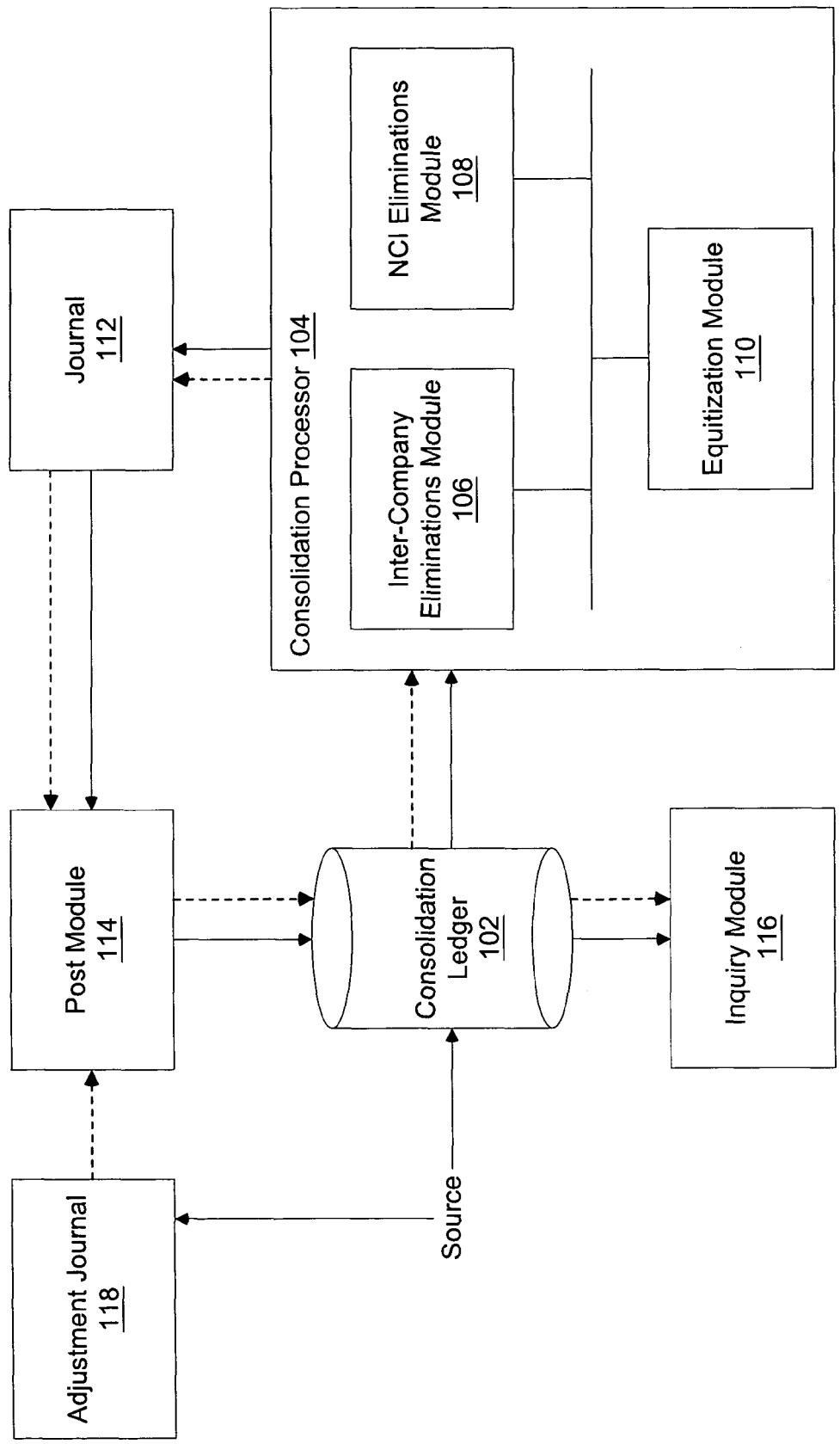
FIG. 1b is a block diagram of the prior art consolidation system providing for adjustment processing.
Figure 2A:
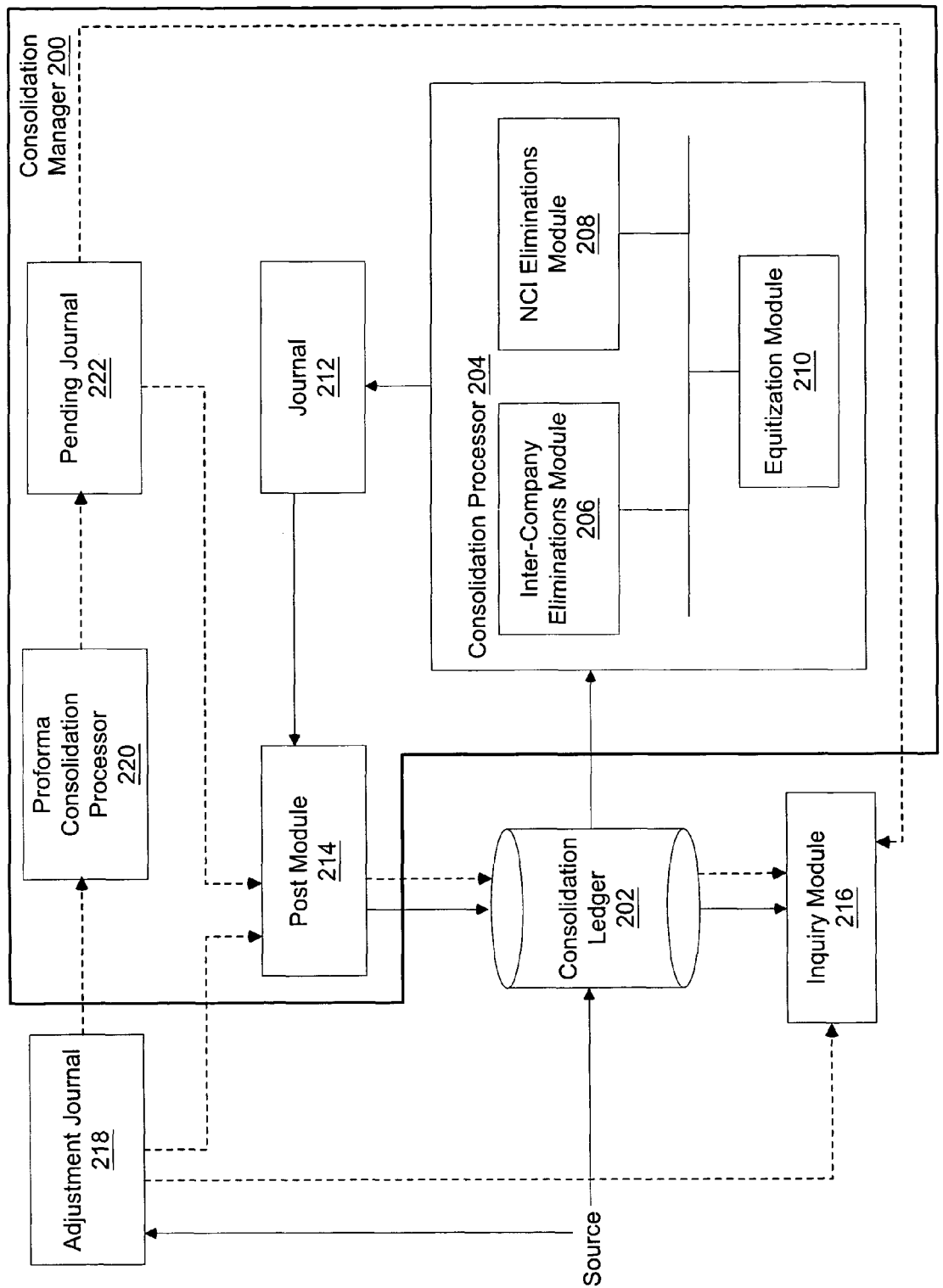
FIG. 2a is an exemplary block diagram of a proforma consolidation system, according to one embodiment of the present invention.

Referring to FIG. 2a, a block diagram of an exemplary proforma consolidation system according to one embodiment of the present invention is shown. In this embodiment, the consolidation processing (i.e., solid lines) is the same as the prior art system. Source information from various source ledgers are input to a consolidation ledger 202. A consolidation processor 204 comprising an inter-company eliminations module 206, a NCI (non-controlling interest) module 208, and an equitization module 210, performs consolidation on the relevant consolidation ledger 202 entries. Once the consolidation processing is complete, results are output to a journal 212, and posted by a post module 214 back to the consolidation ledger 202. The contents of the consolidation ledger 202 may be viewed via an inquiry module 216.

The present invention provides an efficient system for consolidation of adjustments (i.e., dashed lines). In an exemplary embodiment, adjustment entries (e.g., rows and/or lines) are provided to an adjustment journal 218. These adjustment entries, unlike the prior art, are not posted to the consolidation ledger 202 for processing by the consolidation processor 204. Instead, the adjustment entries are forwarded to a proforma consolidation processor 220. According to the present invention, the proforma consolidation processor 220 performs consolidation on only the adjustment entries. The results from the proforma consolidation processor 220 are output to a pending journal 222 resulting in at least one pending journal entry (i.e., consolidate adjustment entry).

A user may then view the pending journal entries of the pending journal 222 via the inquiry module 216. The inquiry module 216 may display the pending journal entries, the corresponding adjustment entries from the adjustment journal 218, at least one ledger balance from the consolidation ledger 202, at least one proforma ledger balance, or any combination of these, as will described further herein. The proforma ledger balances are resulting balances should the user decide to post pending journal entries to the consolidation ledger 202. Thus, the user has visibility into how the adjustment entries impact an overall consolidation prior to approving and finalizing the posting of adjustment entries to the consolidation ledger 202. Should the user decide to post the adjustment entries, the post module 214 will post both the adjustment entries from the adjustment journal 218 and the pending journal entries from the pending journal 222 to the consolidation ledger 202 thus updating the data in the consolidation ledger 202.

The user may perform 'what if' scenarios by modifying adjustments entries in the adjustment journal 218. For example, the user may run proforma consolidation processing with a first set of adjustment entries and view the results of an impact this first set will cause on the ledger balance in the consolidation ledger 202. The user may then input a second set of adjustment entries, different from the first set, run the proforma consolidation processing on the second set, and view the results of an impact this second set will cause on the ledger balance. This 'what if' iterative process may be repeated as many times as desired by the user. Thus, the user is able to see how changes to the adjustment entries may affect the outcome of the overall consolidation process in a fast and efficient manner.

The present invention is able to process adjustment entries at a faster rate then prior art systems. Returning to the example previously discussed, a parent company and its subsidiaries have 2,000,000 rows of data in the consolidation ledger 202. Of these 2,000,000 rows of data, a consolidation process may run with 500,000 ledger rows (e.g., revenues and expenses for the subsidiaries) which total $75,000 across 199 different departments. Consolidation processing will result in a 200 line journal 212 entry (one line for each of the 199 different departments and one line debiting a parent investment for $75,000) for a total of $75,000. Subsequently, the journal 212 entry is posted to the consolidation ledger 102 resulting in a new overall row count of 2,000,200.

However, assume now that the adjustment journal 218 contains additional revenue for five departments for a total of $3,000. Using double entry accounting, there are ten rows of detail in the adjustment journal 218 (i.e., five rows for revenue entries and five rows with offsets to cash). In the present invention, the adjustment entries are not immediately posted to the consolidation ledger 202. Instead, the five rows of revenue entries are sent to the proforma processor 220. In this embodiment, the results of the previous consolidation processing are not affected. Further, the proforma consolidation processor 220 only processes the five revenue adjustment entry rows (i.e., the five revenue/expense accounts).

A result from the proforma consolidation processor 220 is a six line pending journal 222 entry (one line for each of the five different departments for a total of $3,000 and one line debiting the parent investment account for $3,000). The pending journal 222 is not immediately posted to the consolidation ledger 202, but can be reviewed via the inquiry module 216. If upon review, the results are approved, the ten line adjustment journal 218 is posted by the post module 214 to the consolidation ledger 202, thus adding 10 rows to the consolidation ledger and raising the overall row count to 2,000,210. The proforma pending journal 222 is also posted to the consolidation ledger 202—updating one row and adding five new rows to the consolidation ledger 202 resulting in the overall row count of 2,000,215. Thus, an end result of the proforma consolidation system is a same number of rows and ledger balance as the prior art system. However, the process of the present invention is much more efficient—proforma consolidating only five rows of data in contrast to the 2,000,210 rows of data in the prior art system.

Figure 2B:
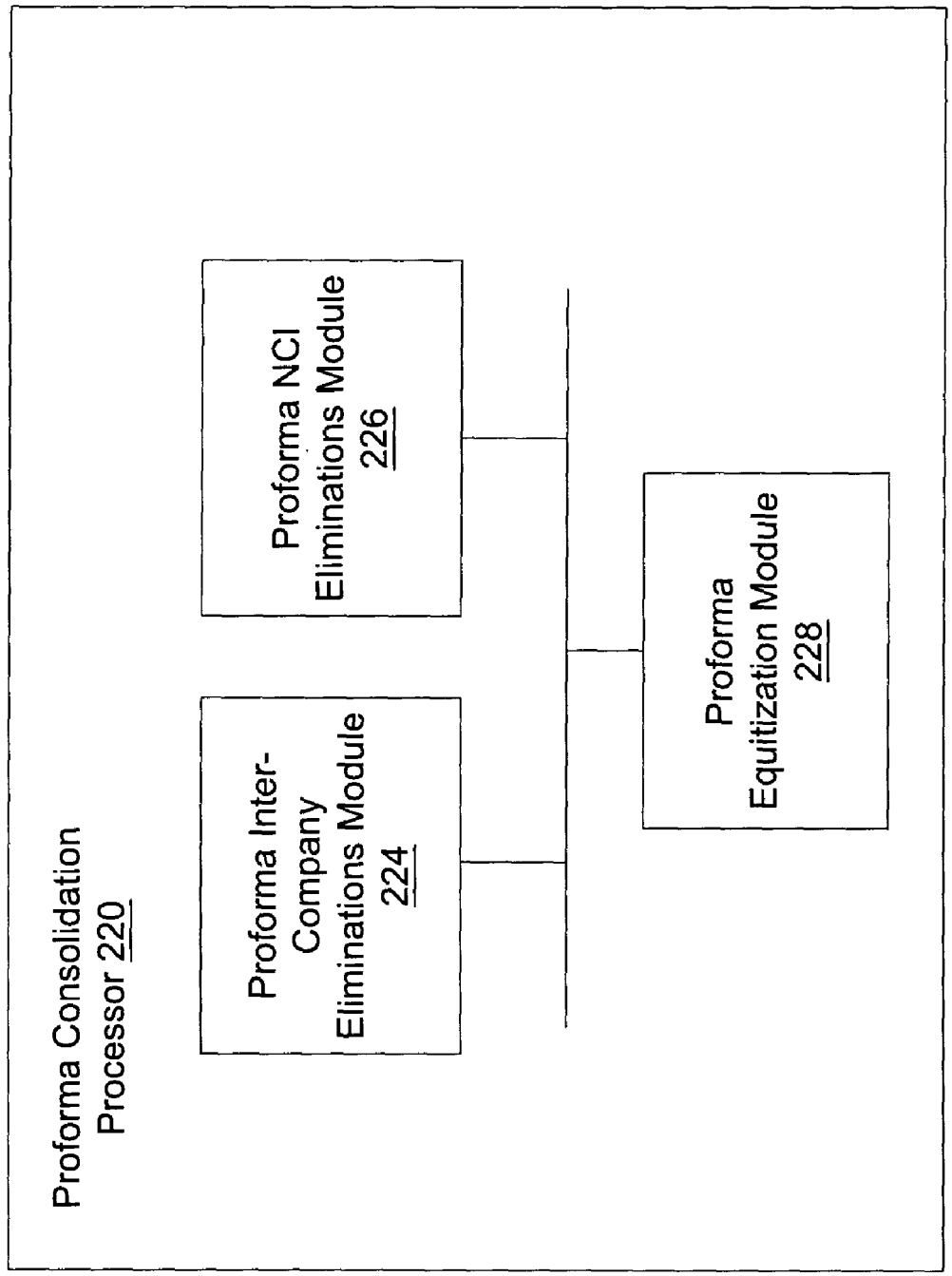

Referring now to FIG. 2b, a more detailed view of the exemplary proforma consolidation processor 220 is shown. The proforma consolidation processor 220 comprises a proforma inter-company eliminations module 224, a proforma non-controlling-interest (NCI) eliminations module 226, and a proforma equitization module 228. The proforma consolidation processor 220 is essentially identical to the consolidation processor 204 (FIG. 2a) but configured for only processing adjustment entries. Both the proforma consolidation processor 220 and the consolidation processor 204 utilize the same set of user defined rules which dictate which accounts to read as inputs, which accounts to write to as output, what relationships are between business units, etc. Furthermore, both consolidation processors 220 and 204 create journals which may (in the case of the proforma consolidation processor 220) or will (in the case of the consolidation processor 204) be posted to the consolidation ledger 202 (FIG. 2b) for the purpose of producing a set of consolidated financial statements. A key difference between the two consolidation processors 220 and 204, however, is that the proforma consolidation processor 220 reads input data (e.g., account codes and amounts to process) from a not-yet-posted journal (i.e., adjustment journal 218 of FIG. 2a) while the regular consolidation processor 204 reads input data from ledger balances in the consolidation ledger 202. A matching of account codes of the pending journal 222 and the ledger balances in the consolidation ledger 202 allows the posting of the pending journal 222 entries into the consolidation ledger 202. The matching of account codes also allows for the display of the proforma ledger balance as will be discussed further herein.

Figure 3:
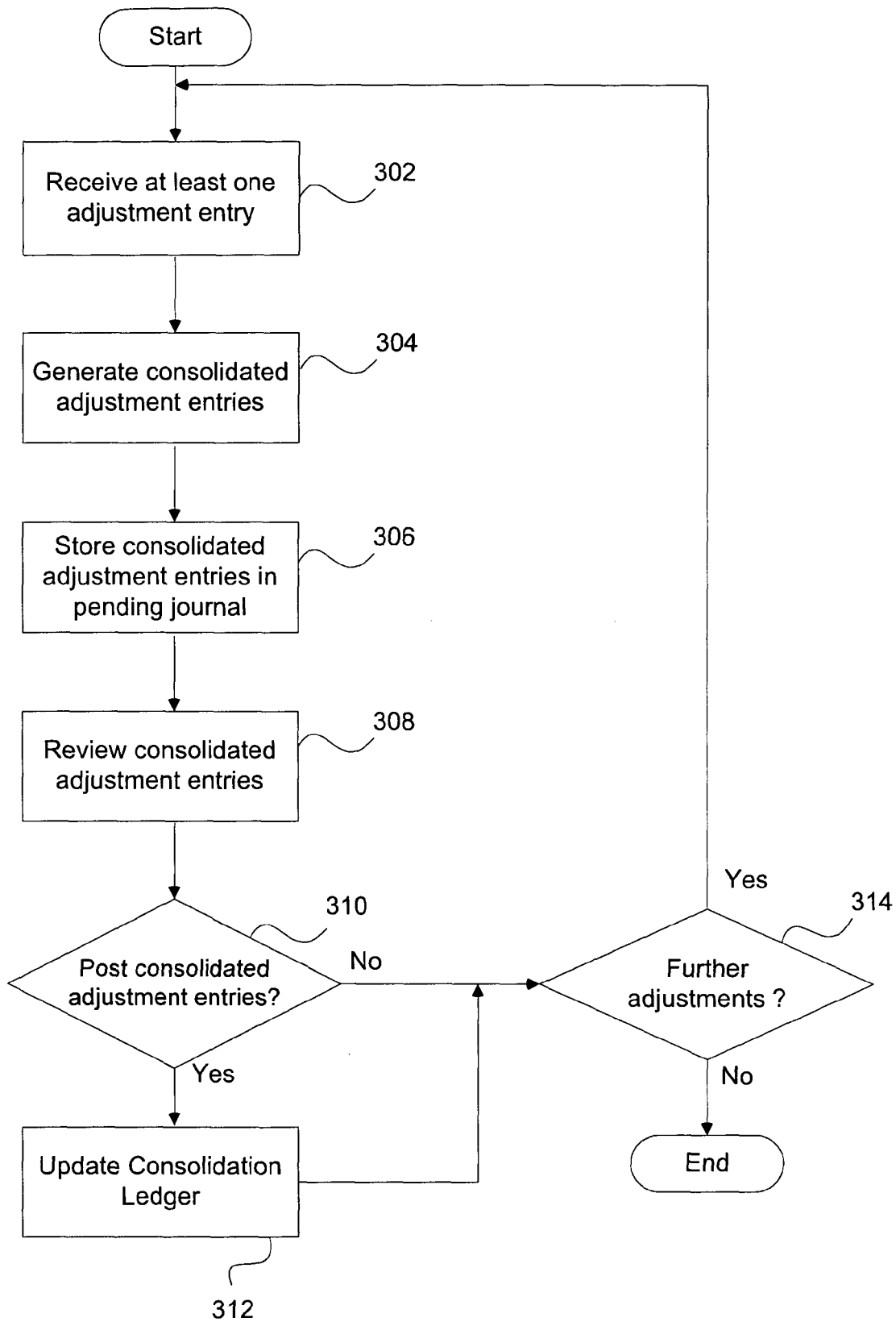
FIG. 3 is a flowchart of an exemplary method for performing proforma consolidation.

FIG. 3 is a flowchart of an exemplary method for performing proforma consolidation of adjustments according to an embodiment of the present invention. In step 302, at least one adjustment entry is received by the proforma consolidation processor 220 (FIG. 2a) from the adjustment journal 218 (FIG. 2a). The at least one adjustment entry is processed by the proforma consolidation processor 220 and one or more consolidated adjustment entries are generated in step 304. The at least one adjustment entry may be processed via the proforma inter-company eliminations module 224 (FIG. 2b), the proforma NCI eliminations module 226 (FIG. 2b), the proforma equitization module 228 (FIG. 2b), or any combination of these or other modules.

The output (i.e., consolidated adjustment entries) of the proforma consolidation processor 220 are temporarily stored in the pending journal 222 (FIG. 2a) in step 306. In optional step 308, the user may review the consolidated adjustment entries (i.e., pending journal entries or rows). In one embodiment, the pending journal entries along with current ledger balances or rows from the consolidation ledger 202 (FIG. 2a) are forwarded to the inquiry module 216 which displays the entries, balances, and an overall proforma ledger balance (i.e., a result of a combination of the pending journal entries and the current ledger balances should the at least one adjustment entry be posted).

Based on the review, the user may choose to post the at least one adjustment entry and the one or more consolidated adjustment entries in optional step 310. If the at least one adjustment entry is posted, then in step 312, the consolidation ledger 202 is updated, and further adjustments may be consolidated in step 314. However, if the user decides not to post the adjustment entries, then the user may consider consolidating other adjustments in step 314 (e.g., incremental changes to the adjustment entries to obtain a different result). If further adjustments are input into the system, then the method returns to step 302.

Figure 4:
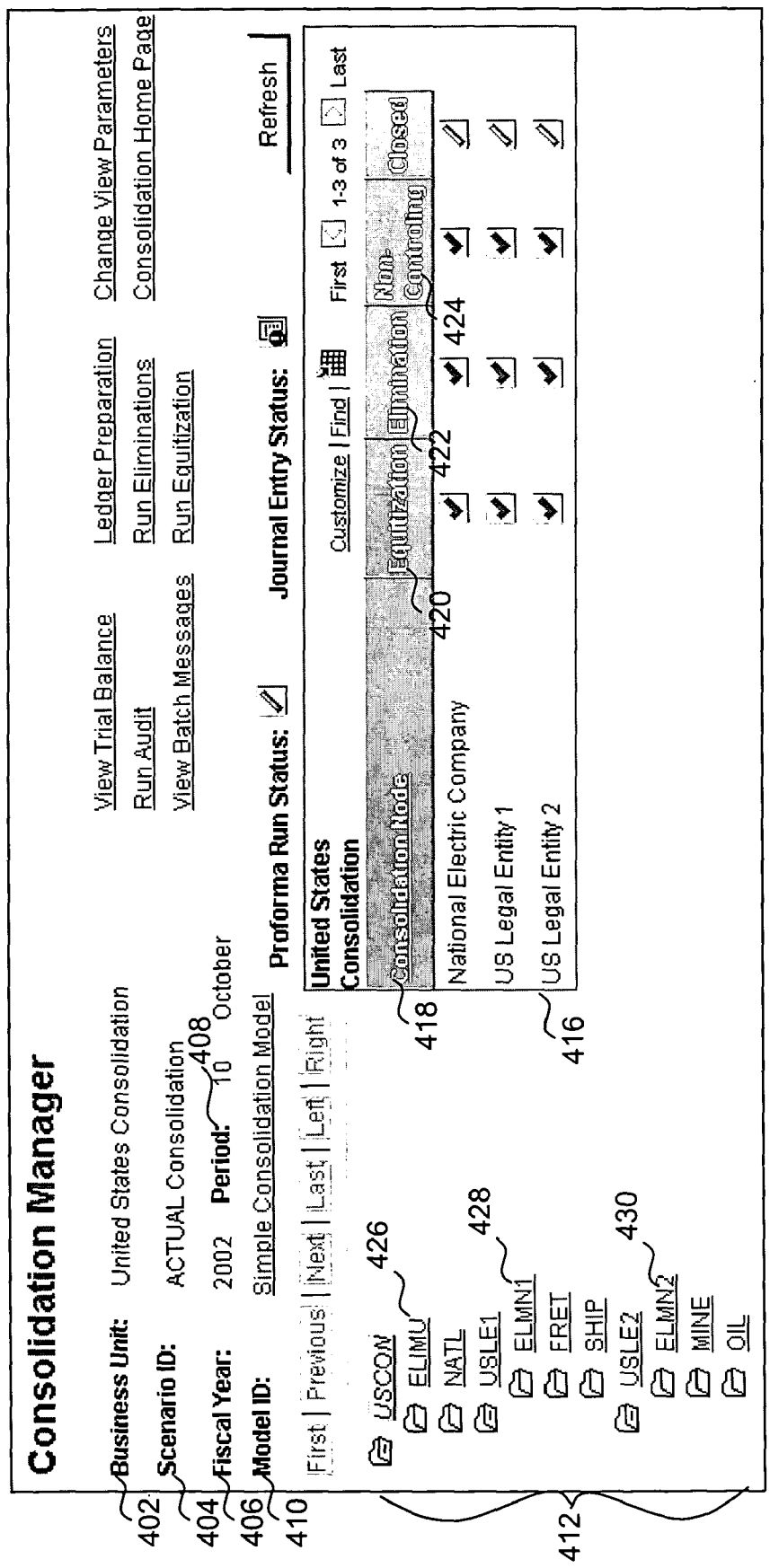
FIG. 4 is an exemplary screen shot of a consolidation manager page.

Referring now to FIG. 4, an exemplary screen shot of a consolidation manager page 400 is shown. In this example, a business unit 402 being consolidated is the "United States Consolidation." The consolidation type taking place is "actual consolidation" according to a scenario ID 404. Alternatively, other consolidation types may comprise different currency consolidations or budget consolidations. Further, this consolidation is occurring in a fiscal year 406 of "2002" over a period 408 of October (i.e., "10").

All rules pertaining to how this consolidation scenario is built is stored in a model ID 410. In the present example, the model ID 410 is based on rules stored in a "simple consolidation model." Each model defines various characteristics of the consolidation such as currency, grouping of entities or units within the consolidation business unit 402, grouping of entities or units by management organization, etc. These rules instruct the system as to how ledger and adjustment data rows (i.e., entries) may be consolidated.

In the present example, a lower left corner of the exemplary screen shot shows a consolidation source menu 412 (i.e., a source tree). This consolidation source menu 412 shows individual sources of data provided for the present consolidation. The same node sources are shown in a consolidation graph 416 shown on a lower right corner of the exemplary screen shot. As shown, within the United States Consolidation, three consolidation nodes 418 provide the source data. In this example, the three consolidation nodes 418 are "National Electric Company," (e.g., a parent company) "US Legal Entity 1," and "US Legal Entity 2." Referring to the consolidation source menu 412, source data (e.g., subsidiaries) for US Legal Entity 1 comprises a freight subsidiary ("FRET") and a shipping subsidiary ("SHIP"). Similarly, source data for US Legal Entity 2 comprises a mining subsidiary ("MINE") and an oil subsidiary ("OIL"). These subsidiaries may also be considered business units within their respective consolidation nodes 418.

As shown in the exemplary consolidation source menu or tree 412, each branch of the source menu 412 contains an entity that stores elimination balances for that particular branch. Thus, for example, "ELIMU" 426 stores total eliminations balances for the business unit 402 United States Consolidation. Within the United States Consolidation, a "ELMN1" 428 and a "ELMN2" 430 stores elimination balances for their respective branch of the source menu 412. Thus, ELMN1 428 stores the total eliminations balances for the US Legal Entity 1 while ELMN2 430 stores the total eliminations balances for the US Legal Entity 2. In the present example, the business unit, "USCON," is selected in the source menu 412 (as shown highlighted in the source menu 412) for a more detailed display in the consolidation graph 416. In a further embodiment, the user may select any of the consolidation source nodes or any branches on the source menu 412 (e.g., USLE1, USLE2, ELMN1, ELMN2, FRET, SHIP, etc.) for a more detailed display in the consolidation graph 416.

The type of consolidation performed on entries from the data sources is shown by various columns in the consolidation graph 416. As shown, an equitization column 420 indicates that the data sources are equitized for all three consolidation nodes 418. Similarly, all three consolidation nodes 418 have had inter-company eliminations, as shown in an elimination column 422, and non-controlling interest eliminations, as shown in an non-controlling column 424, performed. Because all consolidation is marked completed in this consolidation graph 416 (i.e., check marked in columns 420, 422, and 424), the original consolidation process through the consolidation processor 204 (FIG. 2a) is completed.

FIG. 5 is an exemplary screen shot of ledger balances stored in the consolidation ledger 202 (FIG. 2a) based on the original consolidation process through the consolidation processor 204 (FIG. 2a) for the consolidation process as described on the manager page 400 of FIG. 4. According to the present invention, this exemplary screen shot will be displayed via the inquiry module 216 (FIG. 2a). In the present example, the consolidation node "National Electric Company" 512 is selected for further review. A total balance 502 for this node is $46,173.40 (for the selected accounts), and an account balance chart 504 displays a breakdown of the total balance 502. An account column 506 displays an account code for each ledger entry in this node, while a description column 508 displays a definition for each account code. Finally, a ledger balance column 510 displays a ledger balance for each account code of the node, the total of which will equal the total balance 502. For example, account code 170024 is an investment in the shipping subsidiary during the current year with the ledger balance of $549.00. It should be noted that FIG. 5 illustrates a subset of the accounts to be displayed. An alternative embodiment may display all accounts.

Referring now to FIG. 6, an exemplary screen shot of adjustment journal entries (e.g., stored in the adjustment journal 218 of FIG. 2a) is shown. According to the present example, the adjustment journal entries are identified as "ADJ103102B" in a journal ID 602 and created on a journal date 604 of Oct. 31, 2002. Because status 606 is "valid," the adjustment entries have not been posted to the consolidation ledger 202 (FIG. 2a). Information regarding the journal is provided in a journal information section 608 of the screen shot. Accordingly, the journal pertains to a fiscal year 610 of "2002" for a period 612 of "10" (i.e., October) and will be recorded in a base currency 614 of U.S. dollars. A description 615 allows a user to define the adjustments—in this case, "adjustment to record additional October sales from SHIP subsidiary."

A journal lines chart 616 displays actual adjustment entries to the adjustment journal 218 and comprises a ledger unit 618, an account code 620, a department 622, a product ID 624, a currency 626 for the adjustment line, and an amount 628. In the present example, a first line shows a sale of $500.00 USD (in SHIP's sales account #400000), while a second line shows an account receivable of $500.00 USD from the sale (in SHIP's accounts receivable account #120000) for the shipping subsidiary. Thus in a journal totals chart 630, a total debit 632 for $500.00 and a total credit 634 of $500.00 are shown for the shipping subsidiary.

Referring now to FIG. 7, an exemplary screen shot of a equitization consolidation page 700 is shown. This equitization consolidation page 700 provides instructions to the system as to how to perform equitization consolidation on adjustments. Continuing with the same example of FIGS. 4-6, equitization consolidation will be performed on the United States Consolidation (unit 702) for the 2002 fiscal year 704 for the October period 706 (i.e., period "10") within the actual consolidation scenario ID 708 (i.e., actual consolidation 1 as indicated by "CONACT1"). Because a proforma field 710 is checked, the equitization consolidation will be a proforma equitization consolidation via the proforma consolidation processor 220 (FIG. 2a). A user may choose adjustment journal(s) to perform proforma equitization consolidation upon by selecting a select journals hyperlink 712. Should the user decide to not run a proforma consolidation, the user may instead select a post journal created field 714 which will post the balances of a consolidation (i.e., non-proforma consolidation) to the consolidation ledger 202 (FIG. 2a).

Figure 8:
FIG. 8 is an exemplary proforma eliminations page.

FIG. 8 illustrates an exemplary screen shot of a eliminations consolidation page 800. This page 800 shows elimination consolidation instructions for the United States Consolidation unit 802 with a scenario ID 804 (i.e., actual consolidation 1 as indicated by "CONACT1") over a period 806 (i.e., "10" or October) same as that of FIGS. 4-7. In the present example, a process inter-company eliminations field 808 is checked for consolidation, and the consolidation will be proforma consolidation as indicated by a checked proforma field 810. Similar to the equitization consolidation page 700, the user may chose adjustment journal(s) to perform proforma eliminations consolidation upon by selecting a select journals hyperlink 812. The user may also select, in addition to or instead of the process inter-company eliminations field 808, a process non-controlling interest eliminations field 814 in order to instruct the system to conduct proforma NCI eliminations consolidation. Should the user decide to not run a proforma consolidation, the user may instead select a post journal created field 814 which will post the balances of a consolidation (i.e., non-proforma consolidation) to the consolidation ledger 202 (FIG. 2a).

Figure 9:
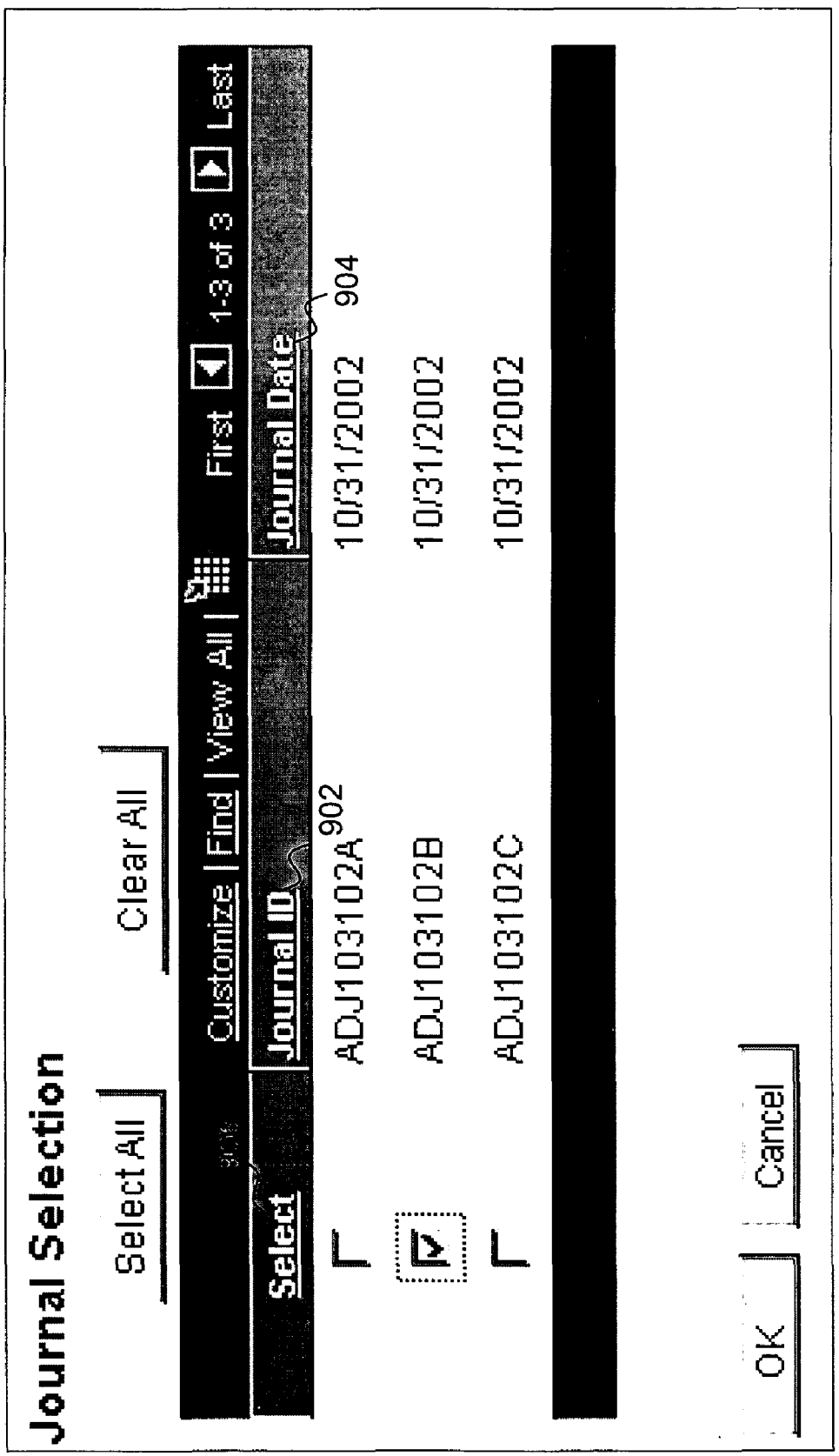
FIG. 9 is an exemplary journal selection page.

Referring now to FIG. 9, an exemplary journal selection screen shot page 900 is shown. This journal selection page 900 is displayed when the user selects the select journals hyperlink 712 (FIG. 7) or 812 (FIG. 8). The screen shot page 900 shows a listing of adjustment journals identified in a journal ID 902 column along with a date of creation of the adjustment journal in a journal data 904 column. In the present invention, these adjustment journals are stored in the adjustment journal 218 (FIG. 2a). As shown, the user may indicate in a select column 906 which adjustment journals should be consolidated through the proforma consolidation processor 220 of FIG. 2a).

FIG. 10a is an exemplary screen shot of a proforma trial balance page 1000 according to one embodiment. This proforma trial balance page 1000 is displayed via the inquiry module 216 after the system has performed a proforma consolidation. At a request of the user, the inquiry module 216 will obtain pending journal balance (i.e., pending journal entries) 1002 resulting from the proforma consolidation stored in the pending journal 222 (FIG. 2a) and current ledger balance 1004 from the consolidation ledger 202 (FIG. 2a) for display. The proforma trial balance page 1000 will also display a proforma ledger balance 1006 which is a resultant ledger balance should the adjustment(s) and pending journal entries 1002 be posted to the consolidation ledger 202.

Referring back to the ongoing example of FIGS. 4-9, account code 170024 (shown in an account 1008 column) has a trial balance (i.e., ledger balance 510 in the consolidation ledger 202 post-consolidation through the consolidation processor 204) of $549.00 as shown in FIG. 5. This ledger balance 510 is provided to the inquiry module 216 and displayed as the ledger balance 1004. Pending journal balance (i.e., pending journal entry) 1002 from the proforma consolidation processing of the adjustment journal entries of FIG. 6 of $500.00 for account 170024 and −$500.00 for account 400011 are obtained from the pending journal 222 and displayed. The proforma ledger balance 1006 is then a combination of the ledger balance 1004 (i.e., for account code 170024 is $549.00) and the pending journal balance 1002 (i.e., for account code 170024 is $500.00). In the present example, the proforma ledger balance 1006 is $1,049.00. for account code 170024.

In the present proforma trial balance page 1000, only accounts 1008 having pending journal balances 1002 are displayed. However, in an alternative embodiment, all accounts 1008 in the consolidation ledger 202 may be displayed. In yet a further embodiment, the user is able to select the accounts 1008 to view via the inquiry module 216 (see for example FIG. 10b which shows the same accounts as in the FIG. 5 balance page). Based on a review of the proforma trial balance page 1000, the user may decide to post the adjustment entries and pending journal balances 1006 to the consolidation ledger 202. Alternatively, the user may perform more proforma consolidation processing using different adjustment entries.

The exemplary screen shots of FIGS. 4-10b are illustrative according to embodiments of the present invention. It should be noted that the layouts and fields of the screen shots may be organized in a different fashion and other or different fields may be utilized.

The present invention has been described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A system for consolidating adjustments comprising:
   an accounting adjustment journal configured for receiving at least one accounting adjustment entry, the at least one accounting adjustment entry resulting, based on double entry accounting, in at least two rows of transaction details in the accounting adjustment journal, wherein said accounting adjustment journal is separate from an accounting consolidation ledger;
   an accounting consolidation processor configured for consolidating the accounting consolidation ledger and further configured to post results of the consolidation to the accounting consolidation ledger;
   a proforma accounting consolidation processor configured for processing the at least two rows of transaction details to create at least two rows of consolidated transaction details, at least one row of the consolidated transaction details corresponding to the accounting adjustment entry, and at least one row of the consolidated transaction details corresponding to an offset of the at least two rows of transaction details in the accounting consolidation ledger, the proforma accounting consolidation processor processing the at least one accounting adjustment entry independent of the accounting consolidation ledger by determining account codes that are affected by the at least one accounting adjustment entry;
   an accounting pending journal configured for storing the at least two rows of consolidated transaction details, wherein said accounting pending journal is separate from said accounting consolidation ledger and said accounting adjustment journal;
   an inquiry module configured for displaying accounting consolidation ledger balances, the accounting consolidation ledger balances associated with account codes, the inquiry module further configured to display proforma accounting consolidation ledger balances, the proforma accounting consolidation ledger balances being resultant ledger balances after applying the at least one consolidated accounting adjustment entry to the accounting consolidation ledger balances by updating the ledger balance by the at least one row of the consolidated transaction details corresponding to the offset and corresponding to the determined account codes; and
   a post module configured to post the at least two rows of transaction details and the at least two rows of consolidated transaction details to the accounting consolidation ledger after review by a user, wherein posting the at least two rows of consolidated transaction details to the accounting consolidation ledger includes determining, based on an account code of the at least one consolidated accounting adjustment entry, if an entry in the consolidation ledger will be created or if an entry that already exists in the accounting consolidation ledger will be updated, and creating or updating based on the determination.

2. The system of claim 1 further comprising an inquiry module configured for displaying the at least one consolidated accounting adjustment entry.

3. The system of claim 1 further comprising an inquiry module configured for displaying at least one proforma accounting ledger balance.

4. The system of claim 1 wherein the proforma accounting consolidation processor further comprises a proforma inter-company eliminations module configured for performing inter-company eliminations on the at least one accounting adjustment entry.

5. The system of claim 1 wherein the proforma accounting consolidation processor further comprises a proforma NCI eliminations module configured for performing non-controlling interest eliminations on the at least one accounting adjustment entry.

6. The system of claim 1 wherein the proforma accounting consolidation processor further comprises a proforma equitization module configured for performing equitization on the at least one accounting adjustment entry.

7. A method for consolidating accounting adjustments comprising:
   consolidating an accounting consolidation ledger using an accounting consolidation processor;
   receiving at least one accounting adjustment entry the at least one accounting adjustment entry resulting, based on double entry accounting, in at least two rows of transaction details in an accounting adjustment journal;
   consolidating the at least two rows of transaction details using a proforma accounting consolidation processor, the proforma accounting consolidation processor processing the at least two rows of transaction details independent of the accounting consolidation ledger by determining account codes that are affected by the at least one accounting adjustment entry, to generate at least two rows of consolidated transaction details, at least one row of the consolidated transaction details corresponding to the accounting adjustment entry, and at least one row of the consolidated transaction details corresponding to an offset of the at least two rows of transaction details in the accounting consolidation ledger;
   storing the at least two rows of consolidated transaction details in a pending accounting journal;

displaying an accounting consolidation ledger balance, the accounting consolidation ledger balance indicating a ledger balance for each account code after consolidation;

displaying a proforma accounting consolidation ledger balance, the proforma accounting consolidation ledger balance obtained by applying the at least one row of the consolidated transaction details corresponding to the accounting adjustment entry to the ledger balances of corresponding account codes of the consolidation ledger balance; and posting the at least two rows of transaction details and the at least two rows of consolidated transaction details to the accounting consolidation ledger after review by a user, wherein posting the at least two rows of consolidated transaction details to the accounting consolidation ledger includes determining, based on an account code of the at least one consolidated accounting adjustment entry, if an entry in the consolidation ledger will be created or if an entry that already exists in the accounting consolidation ledger will be updated, and creating or updating based on the determination.

8. The method of claim 7 further comprising displaying the at least one consolidated accounting adjustment entry.

9. The method of claim 7 further comprising displaying at least one proforma accounting ledger balance.

10. The method of claim 7 wherein consolidating the at least one accounting adjustment entry further comprises consolidating inter-company eliminations.

11. The method of claim 7 wherein consolidating the at least one accounting adjustment entry further comprises consolidating non-controlling interest eliminations.

12. The method of claim 7 wherein consolidating the at least one accounting adjustment entry further comprises performing equitization on the at least one accounting adjustment entry.

13. A non-transitory computer readable medium having embodied thereon a program, the program being executable by a machine to perform a method for consolidating accounting adjustments comprising:

consolidating an accounting consolidation ledger using an accounting consolidation processor;

receiving at least one accounting adjustment entry, the at least one accounting adjustment entry resulting, based on double entry accounting, in at least two rows of transaction details in an accounting adjustment journal;

consolidating the at least two rows of transaction details using a proforma accounting consolidation processor, the proforma accounting consolidation processor processing the at least two rows of transaction details independent of the accounting consolidation ledger by determining account codes that are affected by the at least one accounting adjustment entry, to generate at least two rows of consolidated transaction details, at least one row of the consolidated transaction details corresponding to the accounting adjustment entry, and at least one row of the consolidated transaction details corresponding to an offset of the at least two rows of transaction details in the consolidated accounting ledger;

storing the at least two rows of consolidated transaction details in a pending accounting journal;

displaying an accounting consolidation ledger balance, the accounting consolidation ledger balance indicating a ledger balance for each account code after consolidation;

displaying a proforma accounting consolidation ledger balance, the proforma accounting consolidation ledger balance obtained by applying the at least one row of the consolidated transaction details corresponding to the accounting adjustment entry to the ledger balances of corresponding account codes of the consolidation ledger balance; and posting the at least two rows of transaction details and the at least two rows of consolidated transaction details to the accounting consolidation ledger after review by a user, wherein posting the at least two rows of consolidated transaction details to the accounting consolidation ledger includes determining, based on an account code of the at least one consolidated accounting adjustment entry, if an entry in the consolidation ledger will be created or if an entry that already exists in the accounting consolidation ledger will be updated, and creating or updating based on the determination.

14. The non-transitory computer readable medium of claim 13 further comprising displaying the at least one consolidated accounting adjustment entry.

15. The non-transitory computer readable medium of claim 13 further comprising displaying at least one proforma accounting ledger balance.

16. The non-transitory computer readable medium of claim 13 wherein consolidating the at least one accounting adjustment entry further comprises consolidating inter-company eliminations.

17. The non-transitory computer readable medium of claim 13 wherein consolidating the at least one accounting adjustment entry further comprises consolidating non-controlling interest eliminations.

18. The non-transitory computer readable medium of claim 13 wherein consolidating the at least one accounting adjustment entry further comprises performing equitization on the at least one accounting adjustment entry.

* * * * *